(12) United States Patent
Kwaśniewski

(10) Patent No.: US 11,499,742 B2
(45) Date of Patent: Nov. 15, 2022

(54) DOOR CLOSURE MECHANISM

(71) Applicant: Hamilton Sundstrand Corporation, Charlotte, NC (US)

(72) Inventor: Pawel Kwaśniewski, Oława (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 639 days.

(21) Appl. No.: 16/407,289

(22) Filed: May 9, 2019

(65) Prior Publication Data

US 2020/0002991 A1    Jan. 2, 2020

(30) Foreign Application Priority Data

Jun. 29, 2018 (EP) .................................... 18461569

(51) Int. Cl.
*B64C 1/14*    (2006.01)
*F24F 13/06*    (2006.01)

(52) U.S. Cl.
CPC ............ *F24F 13/06* (2013.01); *B64C 1/1407* (2013.01)

(58) Field of Classification Search
CPC .......... F24F 13/06; B64C 1/14; B64C 1/1407; E05F 15/619; E05Y 2201/694; B66F 7/065; B66F 7/0658; Y10T 16/524; Y10T 29/49648; F16C 11/04; F16C 11/06–0695; F16C 11/12; F16C 11/08–083; B60G 7/005; B63B 19/14
USPC .............................. 251/84, 85, 86; 137/527.4
See application file for complete search history.

(56) References Cited

U.S. PATENT DOCUMENTS

| | | | | |
|---|---|---|---|---|
| 1,473,282 | A | * 11/1923 | Cosgrove, Jr. | ............ F16K 3/10 137/625.28 |
| 2,398,089 | A | * 4/1946 | Fehr | ........................ F16K 17/00 137/245 |
| 5,056,951 | A | * 10/1991 | Mariani | .................. E05D 15/28 403/90 |
| 6,065,523 | A | 5/2000 | Sanz | |
| 6,454,210 | B1 | 9/2002 | Plattner | |

(Continued)

FOREIGN PATENT DOCUMENTS

| | | |
|---|---|---|
| CN | 105064841 A | 11/2015 |
| EP | 2415663 A1 | 2/2012 |
| GB | 543753 A * | 3/1942 ........... F16K 27/102 |

OTHER PUBLICATIONS

EPO Official Letter for Application No. 18461569.8, dated Mar. 3, 2021, 4 pages.

(Continued)

*Primary Examiner* — Edelmira Bosques
*Assistant Examiner* — Michael James Giordano
(74) *Attorney, Agent, or Firm* — Cantor Colburn LLP

(57) ABSTRACT

There is provided a door mechanism comprising a door and a door closure mechanism for moving the door between a first, open, position and second, closed position. The door closure mechanism comprises a drive motor coupled to a drive screw, the drive screw having a first, right handed thread portion and a second, left handed thread portion, a first drive nut threadedly engaged with the first thread portion, a second drive nut threadedly engaged with the second thread portion, a first drive linkage pivotally coupled to the first drive nut at one end and to the door at a second, opposed end, and a second drive linkage pivotally coupled to the second drive nut at one end and to the door at a second, opposed end.

11 Claims, 4 Drawing Sheets

(56) References Cited

U.S. PATENT DOCUMENTS

| | | | | |
|---|---|---|---|---|
| 8,622,368 B2* | 1/2014 | Geiser | ............... | F16K 1/2007 |
| | | | | 251/301 |
| 2006/0125283 A1* | 6/2006 | Guler | ............... | E05F 15/619 |
| | | | | 296/146.4 |

OTHER PUBLICATIONS

Extended European Search Report for International Application No. 18461569.8 dated Nov. 12, 2018, 8 pages.

* cited by examiner

DOOR CLOSURE MECHANISM

FOREIGN PRIORITY

This application claims priority to European Patent Application No. 18461569.8 filed Jun. 29, 2018, the entire contents of which is incorporated herein by reference.

TECHNICAL FIELD

The present disclosure relates to doors and door closure mechanisms as may be used, for example, in aircraft and the like where a flush door mounting may be required. One typical application may be an exhaust door for an air conditioning system.

BACKGROUND

Certain aircraft systems, for example air conditioning systems use doors which may be mounted substantially flush with a surrounding surface. For example, an air conditioning exhaust duct may be provided with such a door.

Typically, the door is mounted on an arm which is rotatably mounted around a pivot formed in the surrounding structure. The door is driven by a rotary actuator which in turn rotates the pivot arm. The door typically engages on a seat provided in an opening in the surrounding structure. In many cases, the structure to which the door is mounted may be made from glass or carbon fibre. The manufacturing tolerances associated with these materials may be quite high meaning that the door mounting may need careful adjustment such that a proper engagement with the seat is achieved. For example, the door may need shimming on the pivot arm to ensure that it properly engages with the opening. This may lead to quite complicated door closure constructions.

Moreover, should a foreign object become lodged on the seat, particularly in a position adjacent the arm pivot, the door will be prevented from closing fully.

SUMMARY

In accordance with an aspect of the disclosure, there is provided a door mechanism comprising a door and a door closure mechanism for moving the door between a first, open, position and second, closed position. The door closure mechanism comprises a drive motor coupled to a drive screw, the drive screw having a first, right handed thread portion and a second, left handed thread portion, a first drive nut threadedly engaged with the first thread portion, a second drive nut threadedly engaged with the second thread portion, a first drive linkage pivotally coupled to the first drive nut at one end and to the door at a second, opposed end, and a second drive linkage pivotally coupled to the second drive nut at one end and to the door at a second, opposed end. Rotation of the drive motor causes the first and second drive nuts in opposite directions along the drive screw so as to raise or lower the door relative to the drive screw.

The above aspect provides a simple design that can raise and lower a door efficiently and using a relatively inexpensive mechanism. Use of opposed threaded portions means that a single motor can be used to raise and lower the door with a minimum of moving parts.

The door closure mechanism may comprising a universal joint arranged between the second ends of the first and second drive linkages and the door. The universal joint may comprise a ball and socket, wherein, optionally, the ball is coupled to the first and second drive linkages and the socket is coupled to the door.

The door closure mechanism may further comprise a stabiliser for resisting rotation of the door relative to the universal joint. The stabilizer may comprise at least one flexible element mounted between the universal joint and the door.

The stabilizer may comprise a support mounted to the universal joint the at least one flexible element being mounted to the support at one end and coupled to the door at an opposed end.

The support may comprise a plurality of arms extending from a hub mounted to, or formed integrally, with the universal joint.

The flexible element may comprise a flexible pin element which is received, optionally with a push fit, in a pocket provided on the door.

The door closure mechanism may comprise a plurality of, for example three, circumferentially equispaced flexible elements.

The door closure mechanism may further comprise a mount for supporting the drive screw and optionally comprising a first mounting bracket for mounting the drive motor and a second mounting bracket for supporting an opposed end of the drive screw.

The door closure mechanism may further comprise an anti-rotation rod optionally extending between the first and second mounting brackets, the first and second drive nuts having anti-rotation bores through which the anti-rotation rod extends.

The first and second drive linkages each comprise a pair of arms arranged on opposite sides of the first and second drive nuts.

The door may comprise a peripheral seal for sealing against a seat in a surrounding structure.

In an aspect of the disclosure, there is provided a door assembly comprising an opening, and a door mechanism as described above, the door being movable to open and close the door opening.

The door opening may define a recess into which the door moves into and out of engagement; wherein optionally the door extends into the opening so as to lie substantially flush with a surface surrounding the recess.

DETAILED DESCRIPTION

Figure 1:
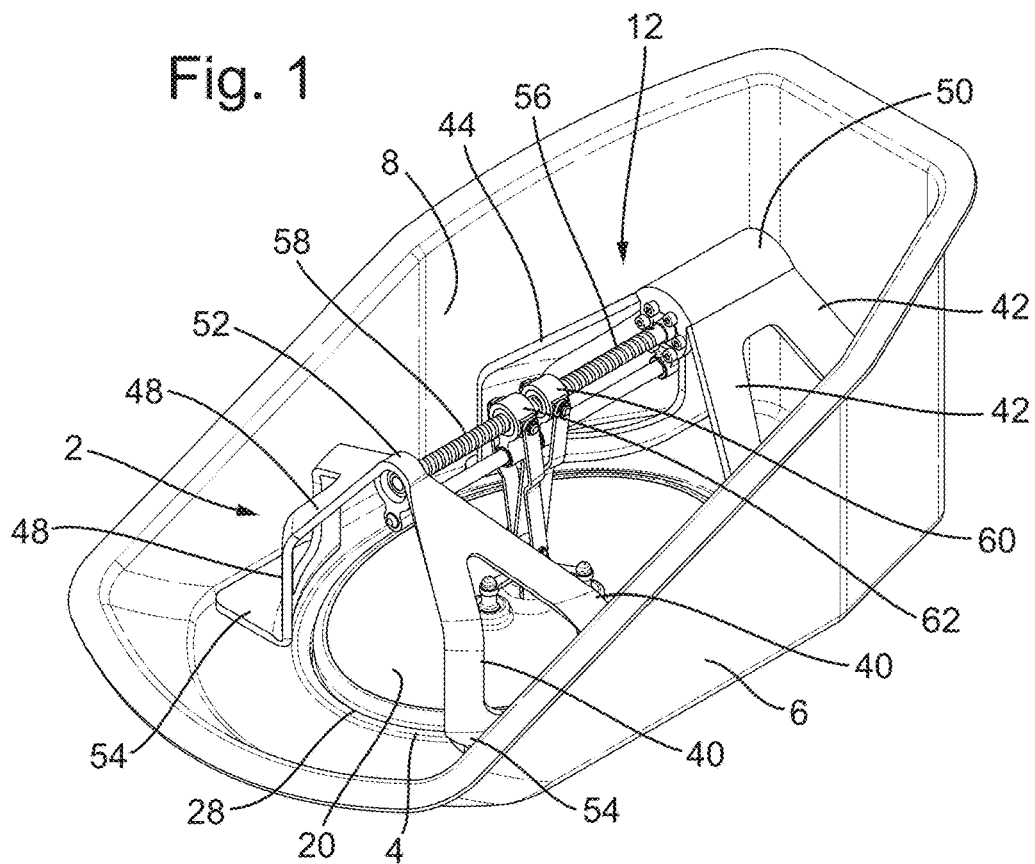
FIG. 1 shows a perspective view of a duct outlet having a door system in accordance with the disclosure in a first, closed configuration.

FIG. 1 shows an exemplary door system 2 in accordance with the disclosure arranged in an opening 4 of a housing 6.

The housing 6 may be an outlet housing for an air conditioning system and may comprise a part (not shown) which together with the housing 6 defines an outlet chamber 8 in which the door closure mechanism 2 is arranged. The housing 6 may be made from a composite material such as a glass fibre or carbon fibre composite material. In other embodiments, the housing 6 may be made from a plastics material, for example a plastics moulding, or a sheet metal material for example.

Figure 3:
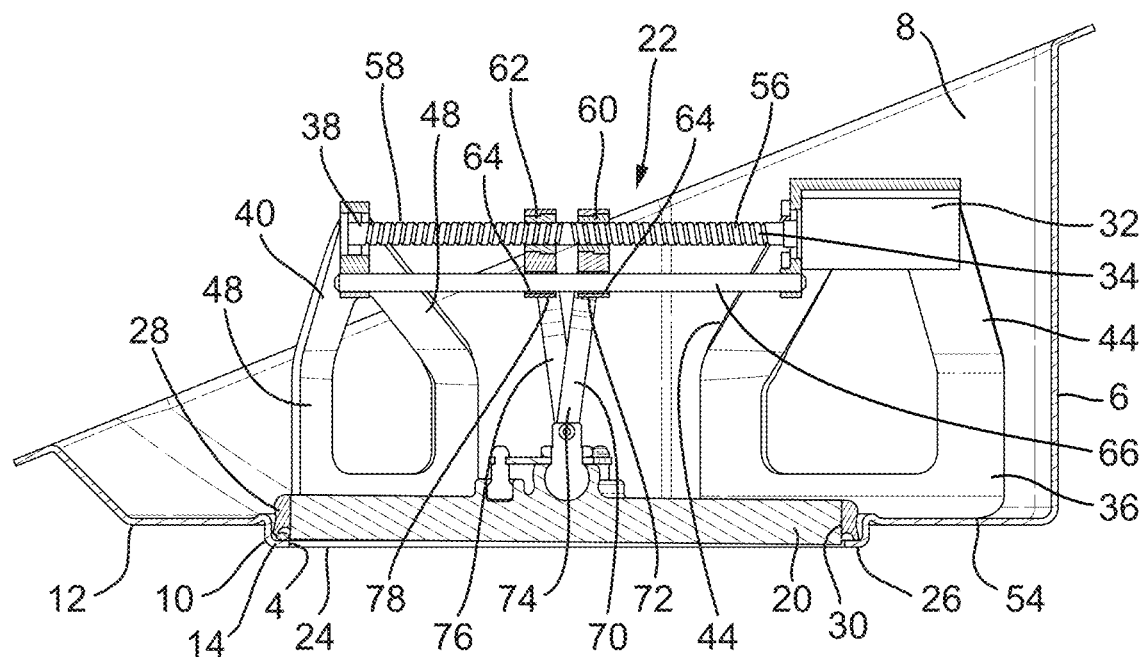
FIG. 3 shows a side elevation of the door system in the configuration of FIG. 1.
Figure 5:
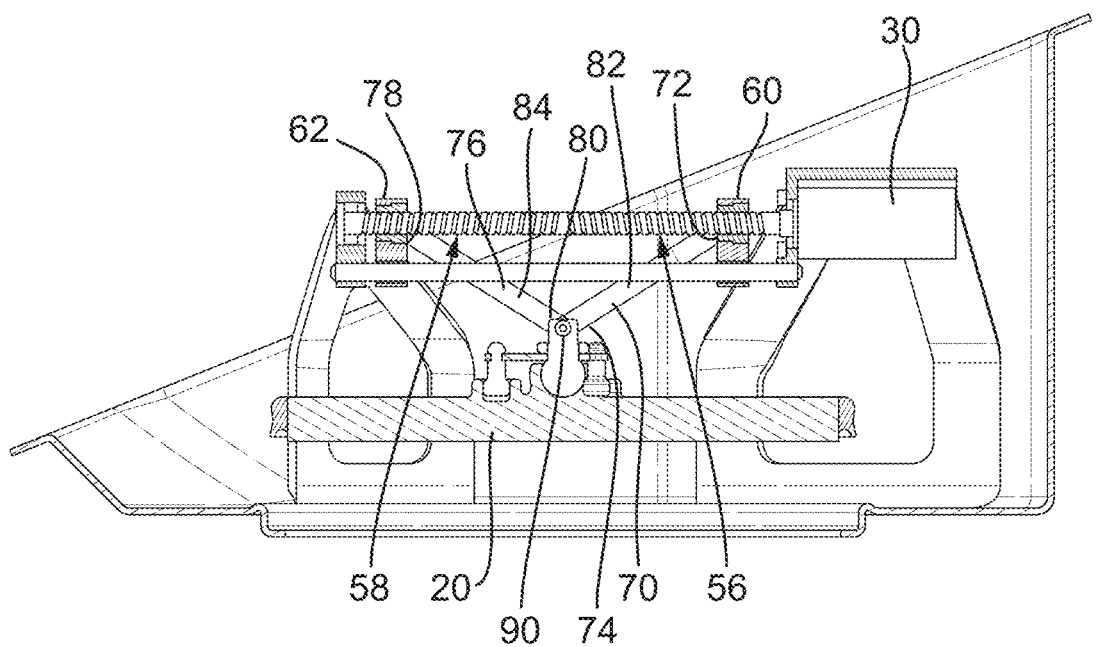
FIG. 5 shows a side elevation of the door system in the configuration of FIG. 2.

As can be seen from FIGS. 3 and 5, for example, the outlet 4 is formed in a downwardly projecting recess 10 formed in the base 12 of the housing. The recess 10 has a radially inwardly projecting lip 14.

The door system comprises a door 20 and a door closure mechanism 22. As can be seen from FIG. 3, for example, in its closed position, the door 20 is received within the recess 10 of the housing base 12 and its lower face 24 lies generally flush with the lower surface 26 of the lip 14. The door 20 further comprises a resilient seal 28 arranged around its circumference 30, the seal 28 engaging with and sealing against the lip 10 of the housing 6 in the closed condition of the door 20 so as to prevent flow of air from the outlet chamber 8 through the outlet 4.

Figure 2:
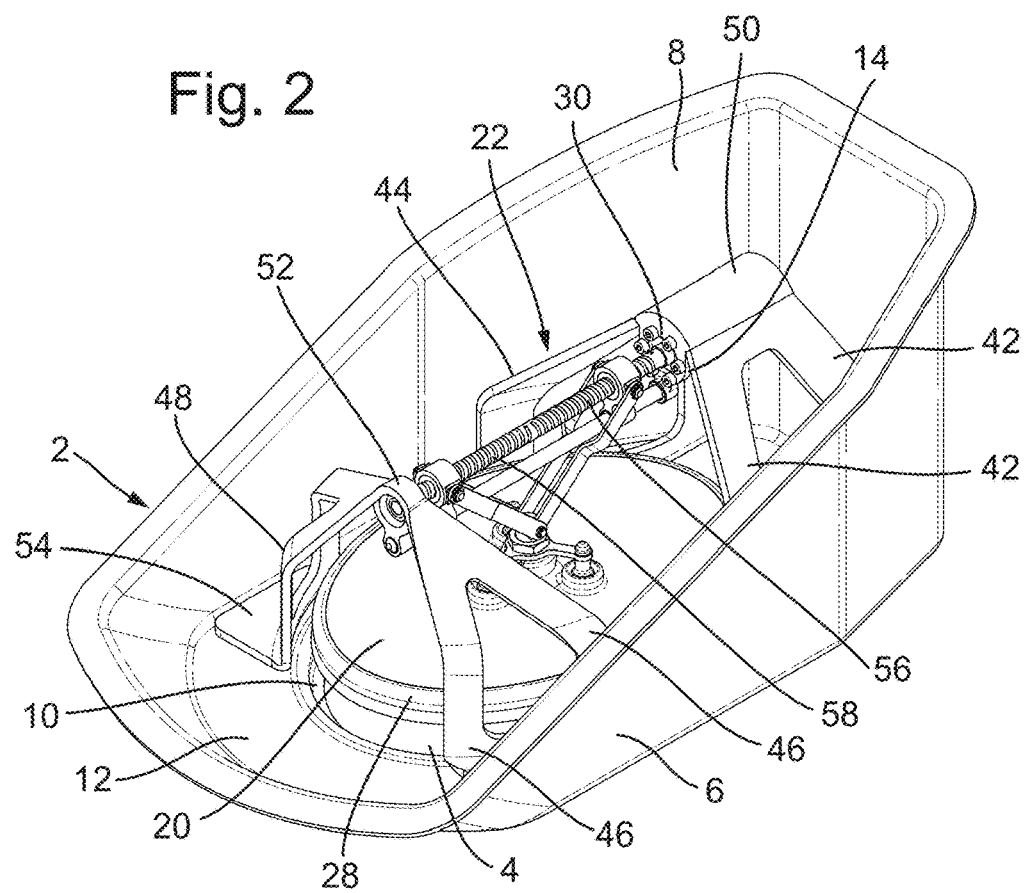
FIG. 2 shows the door system of FIG. 1 in a second, open configuration.
Figure 6:
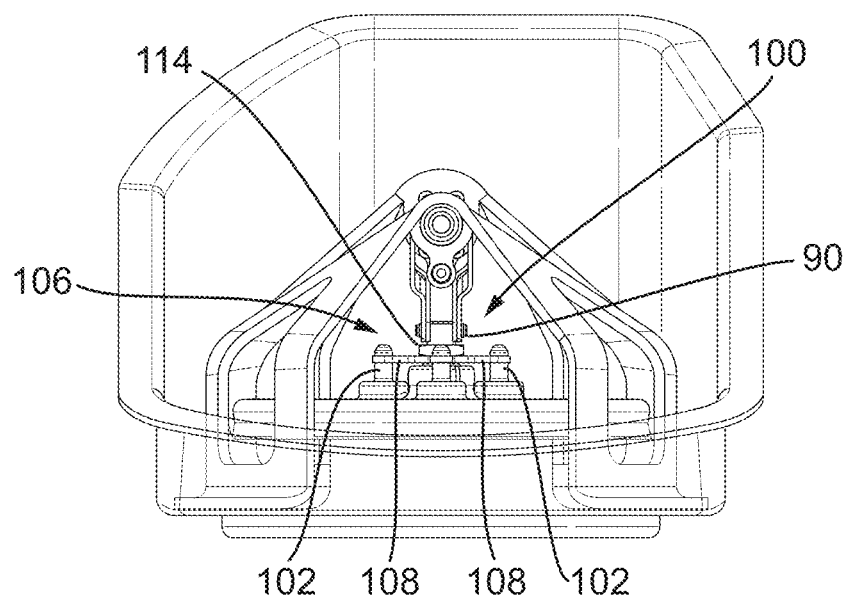
FIG. 6 shows a front elevation of the door system in the configuration of FIG. 2.

The door 20 is moved between its closed position, shown in FIGS. 1, 3, 4, 7 and 8 and its open position shown in FIGS. 2, 5 and 6 by the door closure mechanism 22.

The door closure mechanism 22 comprises a drive motor 32 coupled to a drive screw 34. The drive motor 32 in this embodiment is an electric drive motor 32. The drive motor 32 is mounted in a first mounting bracket 36 which is arranged at one side of the housing outlet 4. The drive screw 34 extends from the drive motor 32 across the housing outlet 4 and is supported in a bearing 38 mounted in a second mounting bracket 40 arranged at an opposite side of the housing outlet 4.

In the embodiment illustrated, each mounting bracket 36, 40 comprises respective pairs of legs 42, 44, 46, 48 which project from a respective central rib 50, 52 across the housing outlet 4 and which are mounted to the housing 6 by means of mounting flanges 54. The mounting flanges 54 may be adhesively secured to the housing base 12 in some embodiments. The mounting brackets 36, 40 may, for example be formed from a plastics material, for example a moulded plastics material or from a metallic material, for example sheet metal.

Returning to the drive screw 34, this comprises a first, right handed thread portion 56 at one end of the drive screw 34 and a second, left handed thread portion 58 at an opposed end of the drive screw 34.

A first, right handed thread drive nut 60 is threadedly engaged with the first thread portion 56 of the drive screw 34. A second, left handed drive nut 62 is threadedly engaged with the second thread portion 58 of the drive screw 34.

The first and second drive nuts 60, 62 each further comprise a bore 64. The bores 64 slidably receive an anti-rotation rod 66. The anti-rotation rod 66 extends across the housing outlet 4 parallel to and, in this embodiment, below the drive screw 34 and is supported at its opposed ends in the first and seconds mounting brackets 36, 40. The anti-rotation rod 66 prevents rotation of the drive nuts 60, 62 on the drive screw 34 during rotation of the drive screw 34.

Figure 4:
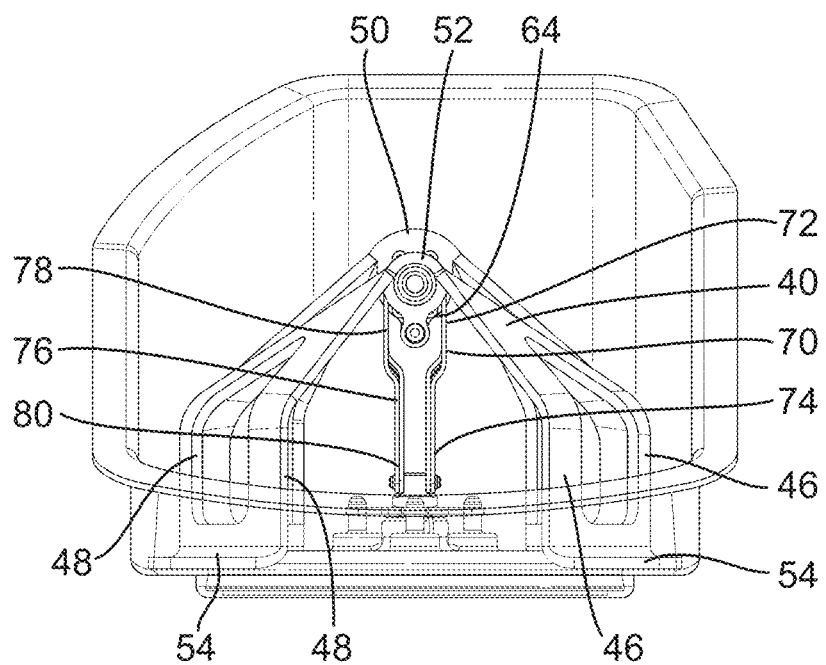
FIG. 4 shows a front elevation of the door system in the configuration of FIG. 1.

As seen in FIG. 4, a first drive linkage 70 is pivotally coupled to the first drive nut 60 at one end 72 and to the door 20 at a second, opposed end 74. A second drive linkage 76 is pivotally coupled to the second drive nut 62 at one end 78 and to the door 20 at a second, opposed end 80.

In this embodiment, and as shown in FIG. 5 the first drive linkage 70 comprises a first pair of drive arms 82, pivotally coupled, at the one end 72 to opposed sides the first drive nut 60 and at the second end 74 to the door 20. The second drive linkage 76 comprises a second pair of drive arms 84, pivotally coupled at the one end 78 to opposed sides of the second drive nut 62 and to the door 20 at the opposed second end 80. The respective pivotal couplings may, for example, be pin joints as shown. The respective drive arms 82, 84 may be cranked in shape, as can be seen for example in FIG. 4.

Figure 7:
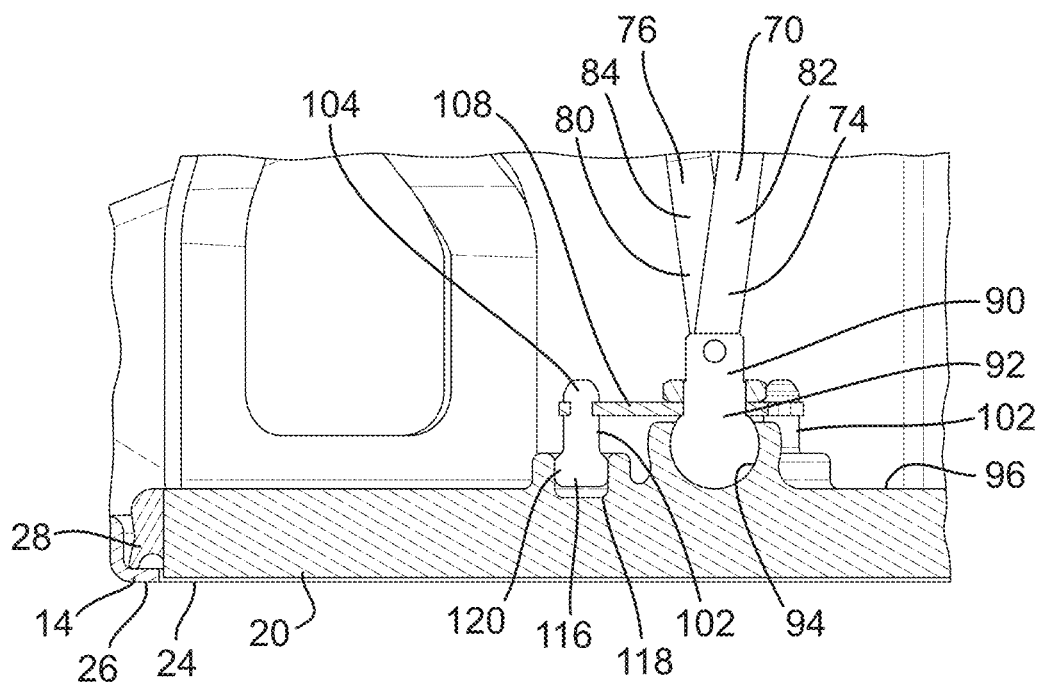
FIG. 7 shows a detail of FIG. 3.

Moving to FIG. 7, the first and second drive linkages 70, 76 are coupled to the door 20 at their respective second ends 74, 80 via a universal joint 90. The universal joint 90 comprises a ball element 92, to which the first and second drive arms 82, 84 are pivotally connected, and a socket 94 formed on an upper surface 96 of the door 20. The socket 94 may be resilient to allow the insertion of the ball element 92. For example in certain embodiments, the socket 94 may have one or more slots (not shown) allowing the socket 94 to expand as the ball element 92 is inserted into the socket 94. The socket 94 may be integrally formed with the door 20 or formed separately therefrom and mounted thereto by suitable means. In other embodiments, the ball element 92 may be provided on the door 20 and the socket 94 may be coupled to the drive arms 82, 84.

The operation of the above mechanism will now be described. Due to the opposite threading of the first and second drive screw portions 56, 58 and the first and second drive nuts 60, 62, rotation of the drive motor 32 and thus rotation of the drive screw 34 will drive the first and second drive nuts 60, 62 in opposite directions along the drive screw 34. This movement is transmitted to the door 20 via the first and second drive arms 82, 84. Movement of the drive nuts 60, 62 away from one another will lift the door 20 away from the housing outlet 4 while movement of the drive nuts 60, 62 towards one another will lower the door 20 towards the outlet 4. In the condition in which the drive nuts 60, 62 are adjacent one another, the door 20 is fully received within the recess 10 and seals with and closes the outlet 4. The mechanism is therefore somewhat like a scissor jack mechanism.

The universal joint 90 will allow the door 20 to pivot relative to the drive arms 82, 84 so as properly to seat in the housing recess 10. Also, as is illustrated schematically in FIG. 8, the universal joint 90 will allow the door 20 to pivot (see arrow 99) should, for example, a foreign object 98 become lodged in the recess 10. This provides for at least some sealing in the event of foreign object contamination.

Also, the universal joint 90 may accommodate at least in part any misalignment of the mounting brackets 36, 40 and the housing 4 arising due to tolerances in the manufacturing and assembly processes.

It will be appreciated, however, that it may be undesirable for the door 20 to be able to rotate substantially freely about the universal joint 90. For example, if able to rotate freely, the door 20 may rotate as it is lifted and not move uniformly away from the outlet 4. To mitigate this possibility, the door is provided with a stabilizer 100 which resists rotation of the door 20 around the universal joint 90.

Figure 8:
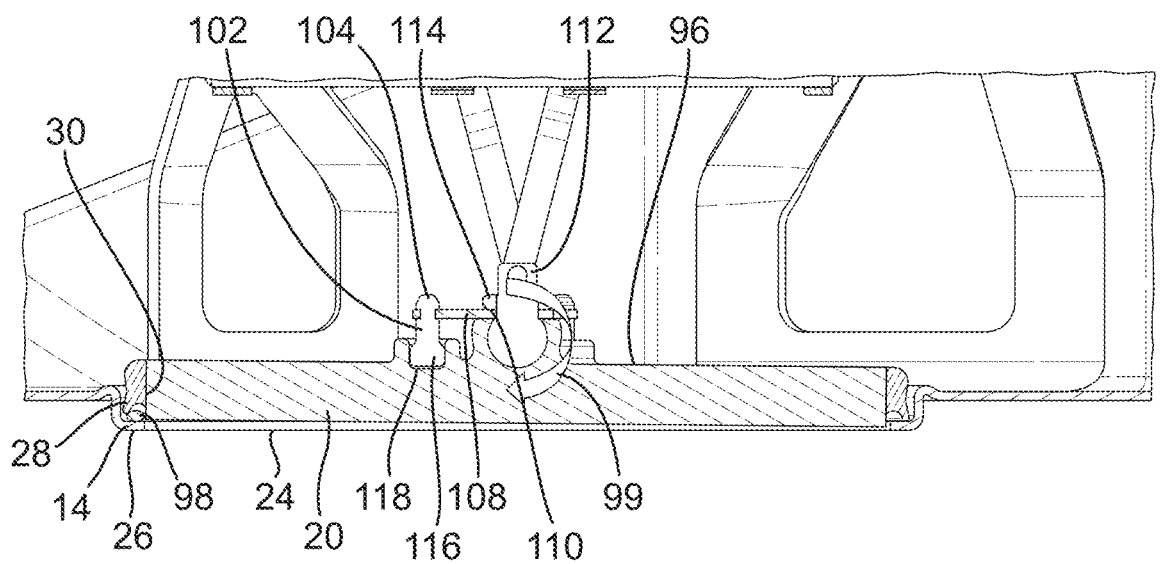
FIG. 8 shows a detail of FIG. 3, but with a foreign object trapped in the duct outlet.

The stabilizer 100 comprises at least one, in this embodiment three, flexible and/or resilient elements 102 mounted between the universal joint 90 and the door 20. The flexible elements 102 are mounted at one end 104 to a support 106 (FIG. 6) which is mounted to the universal joint 90. As shown in FIG. 8, the support 106 comprises three arms 108 which extend from an annular hub 110. The annular hub 110 is mounted over a neck portion 112 of the universal joint 90

(to which the drive arms 82, 84 are attached) and retained thereon by a retaining ring 114. In other embodiments, the support may be formed integrally with the universal joint socket 94. The other end 116 of each flexible element 102 is received in a raised recess 118 on the upper surface 96 of the door 20 The flexible element 102 may be press fitted or bonded into a respective recess 118 and may, for example have an enlarged head 120 (see FIG. 7) received within the recess 118. The flexible elements 102 may be made from any suitable resilient material such as a rubber material.

The initial positions of the flexible elements 102 may be such that the door 20 is maintained parallel to the housing outlet 4, so that the door 20 will be raised and lowered in such an orientation. However, should, for example, a foreign object 98 become lodged in the outlet 4, the flexibility of the flexible elements 102 will allow the door 20 to pivot around the universal joint 90 to accommodate the foreign object 98 as the door 20 closes the outlet 4, as shown in FIG. 8. When the door 20 is opened once more, the flexibility and/or resilience of the elements 102 will act to restore the door 20 to its parallel orientation relative to the outlet 4.

It will be seen from the above that the disclosed door closure mechanism accommodates manufacturing and assembly tolerances and also provides for improved closure of an opening in the event of foreign object contamination.

It will be understood that the above description is of an exemplary embodiment only and that modifications may be made thereto without departing from the scope of the disclosure.

The invention claimed is:

1. A door mechanism comprising:
    a door; and
    a door closure mechanism for moving the door between a first, open, position and second, closed position, the door closure mechanism comprising:
        a drive motor coupled to a drive screw, the drive screw having a first, right handed thread portion and a second, left handed thread portion;
        a first drive nut threadedly engaged with the first thread portion;
        a second drive nut threadedly engaged with the second thread portion;
        a first drive linkage pivotally coupled to the first drive nut at one end and to the door at a second, opposed end;
        a second drive linkage pivotally coupled to the second drive nut at one end and to the door at a second, opposed end;
        wherein rotation of the drive motor causes the first and second drive in opposite directions along the drive screw so as to raise or lower the door relative to the drive screw;
        a universal joint arranged between the second ends of the first and second drive linkages and the door; and
        a stabilizer for resisting rotation of the door relative to the universal joint;
        wherein the stabilizer comprises a support mounted to the universal joint and at least one flexible element mounted to the support at one end and coupled to the door at an opposed end.

2. A door closure mechanism as claimed in claim 1, wherein the universal joint comprises a ball and socket.

3. A door mechanism as claimed in claim 1, wherein the support comprises a plurality of arms extending from a hub mounted to the universal joint.

4. A door mechanism as claimed in claim 1, wherein the flexible element comprises a flexible pin element which is received, optionally with a push fit, in a pocket provided on the door.

5. A door mechanism as claimed in claim 1, comprising a plurality of circumferentially equispaced flexible elements.

6. A door mechanism as claimed in claim 1, further comprising a mount for supporting the drive screw.

7. A door mechanism as claimed in claim 6, further comprising an anti-rotation rod extending between the first and second mounting brackets, the first and second drive nuts having anti-rotation bores through which the anti-rotation rod extends.

8. A door mechanism as claimed in claim 1, wherein the first and second drive linkages each comprise a pair of arms arranged on opposite sides of the first and second drive nuts.

9. A door mechanism as claimed in claim 1, wherein the door comprises a peripheral seal for sealing against a seat in a surrounding structure.

10. A door assembly comprising:
    a door opening; and
    a door mechanism as recited in claim 1 movable to open and close the door opening.

11. A door as claimed in claim 10, wherein the door opening defines a recess into which the door moves into and out of engagement; wherein optionally the door extends into the opening so as to lie substantially flush with a surface surrounding the recess.

* * * * *